US009674850B2

(12) United States Patent
Tian et al.

(10) Patent No.: US 9,674,850 B2
(45) Date of Patent: Jun. 6, 2017

(54) METHOD OF ESTABLISHING RADIO BEARER, ACCESS POINT APPARATUS, USER EQUIPMENT AND SYSTEM

(75) Inventors: Ye Tian, Beijing (CN); Jinbo Zhao, Beijing (CN); Yang Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 144 days.

(21) Appl. No.: 13/983,045

(22) PCT Filed: Jan. 11, 2012

(86) PCT No.: PCT/CN2012/070216
§ 371 (c)(1),
(2), (4) Date: Oct. 15, 2013

(87) PCT Pub. No.: WO2012/103779
PCT Pub. Date: Aug. 9, 2012

(65) Prior Publication Data
US 2014/0029536 A1    Jan. 30, 2014

(30) Foreign Application Priority Data
Jan. 31, 2011   (CN) .......................... 2011 1 0034298

(51) Int. Cl.
*H04W 72/08*   (2009.01)
*H04W 28/24*   (2009.01)

(52) U.S. Cl.
CPC ......... *H04W 72/087* (2013.01); *H04W 28/24* (2013.01)

(58) Field of Classification Search
CPC .............................................. H04W 72/087
See application file for complete search history.

(56) References Cited

U.S. PATENT DOCUMENTS

2007/0258427 A1* 11/2007 Shaheen et al. .............. 370/338
2008/0132269 A1*  6/2008 Shen et al. ................. 455/550.1
(Continued)

FOREIGN PATENT DOCUMENTS

CN       1332545 A     1/2002
CN     101009631 A     8/2007

OTHER PUBLICATIONS

PCT International Search Report for PCT Counterpart Application No. PCT/CN2012/070216, 5 pgs., (Apr. 12, 2012).

(Continued)

*Primary Examiner* — Jason Mattis
(74) *Attorney, Agent, or Firm* — Blakely, Sokoloff, Taylor & Zafman LLP (57) ABSTRACT

Methods, apparatuses, and systems for establishing a radio bearer include a User Equipment (UE) that divides IP data flow of a service into multiple service data flows having different QoS requirements according to media parameter information, determines QoS parameters of each service data flow, and sends each service data flow and the corresponding QoS parameters to an Access Point (AP). The AP allocates wireless resources for each service data flow according to a local QoS strategy, builds the corresponding wireless bearing, and binds the service data flow and the wireless bearing. The UE also builds the corresponding wireless bearing for each service data flow and binds the service data flow and the wireless bearing. During uplink and downlink data transmission, the AP and UE can map each service data flow to the corresponding wireless bearing for transmission according to the QoS requirements of different service data flows.

15 Claims, 6 Drawing Sheets

(56) References Cited

U.S. PATENT DOCUMENTS

2009/0196208 A1* 8/2009 Yu .................. H04W 76/048
                                                    370/311
2012/0134346 A1* 5/2012 Bosch et al. .............. 370/338
2012/0269167 A1* 10/2012 Velev et al. .............. 370/331

OTHER PUBLICATIONS

PCT Written Opinion of the International Searching Authority for PCT Counterpart Application No. PCT/CN2012/070216, 8 pgs., (Apr. 12, 2012).
LTE, "General Packet Radio Service (GPRS) Enhancements for Evolved Universal Terrestrial Radio Access Network (E-UTRAN) Access," 3GPP TS 23.401, Version 9.2.0, Release 9, Oct. 2009.

* cited by examiner

Fig. 1

--PRIOR ART--

Fig. 2

--PRIOR ART--

METHOD OF ESTABLISHING RADIO BEARER, ACCESS POINT APPARATUS, USER EQUIPMENT AND SYSTEM

CROSS-REFERENCE TO RELATED APPLICATIONS

The present application is a U.S. National Stage under 35 U.S.C. §371 of International Application No. PCT/CN2012/070216, filed on Jan. 11, 2012, entitled WIRELESS BEARING BUILDING METHOD, ACCESS POINT EQUIPMENT, USER EQUIPMENT AND SYSTEM, designating the United States, and claiming priority to Chinese Patent Application No. 201110034298.4, filed with the State Intellectual Property Office of China on Jan. 31, 2011 and entitled "Method of establishing radio bearer, access point apparatus, user equipment and radio access system", which was incorporated by reference in its entirety.

The present application claims priority to Chinese Patent Application No. 201110034298.4, filed with the State Intellectual Property Office of China on Jan. 31, 2011 and entitled "Method of establishing radio bearer, access point apparatus, user equipment and radio access system", which is hereby incorporated by reference in its entirety.

FIELD OF THE INVENTION

In recent years, there is a dramatically increasing demand for mobile data traffic along with the popularization of the Mobile Internet and smart cellular phones, and indoor data services take a significant proportion thereof. Indoor and hotspot data services are characterized by typical immobility or very-low-speed mobility (nomadic mobility) of subscribers with a low mobility requirement; and on the other hand, the data services are generally Internet Protocol (IP) based Internet services with a unified Quality of Service (QoS) requirement far below a QoS requirement of telecommunication-level services. Since a traditional cellular mobile communication system is generally designed for the high-speed mobile telecommunication-level services with seamless switching, it may be inefficient and costly to bear the large-traffic low-speed IP data packet services. In view of this, cellular mobile network operators have to find out a low-cost high-capacity solution to a radio data access indoors and in a hotspot area. At present, there are generally the following two solutions.

Figure 1:
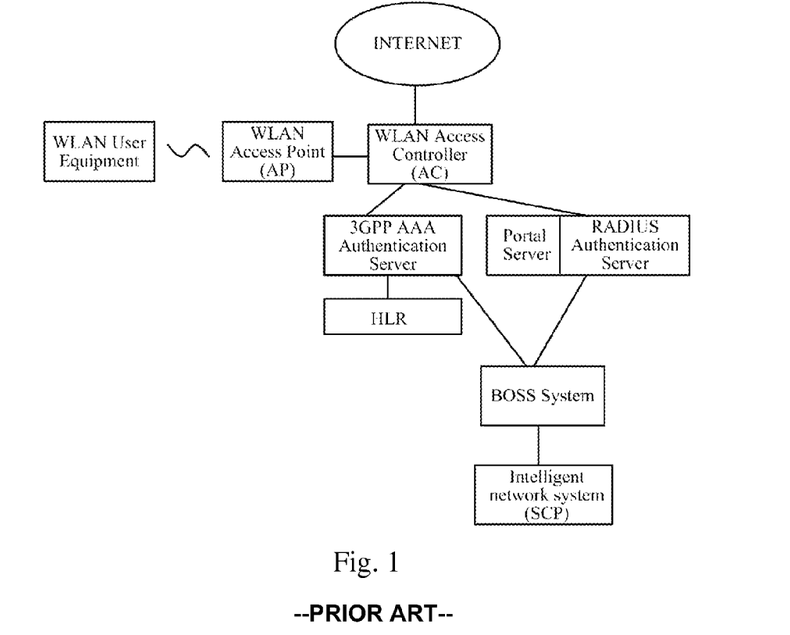
FIG. 1 is a network architectural diagram of a WLAN based solution in the prior art.

A first solution is a Wireless local area network (WLAN) solution in an unlicensed frequency band, for example, a method of offloading a hotspot data service in a Wireless Fidelity (WiFi) system. As illustrated in FIG. 1, in this solution, a WLAN system and a 3G system are loosely coupled to perform authentication and billing in a core network by the 3G system and to have a radio access to the WLAN.

The use of the foregoing architecture to cover a hotspot area can better offload a data service, but the use of the two different standard frameworks and systems results in a poor experience of subscribers and is limited by the WLAN radio access technology, the network can not provide the subscribers with a QoS guaranteed service; and a link quality is unstable exposed to interference of other systems.

Figure 2:
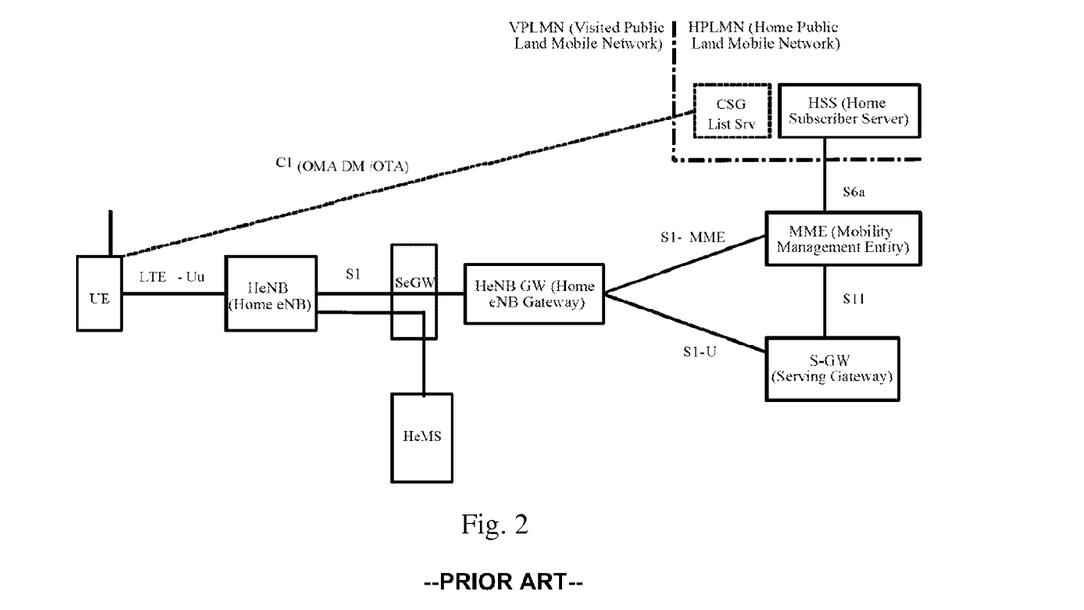
FIG. 2 is a network architectural diagram of a home eNB based solution in the prior art.

A second solution is based on a femto cellular eNB (also referred to as a home ENB or Femto), to meet the demand for data service traffic indoors and in a hotspot. This solution is characterized by a shorter coverage distance indoors and a smaller number of subscribers. Specifically, the transmission power of a home eNB is comparable to a cellular phone terminal, typically below 23 dBm, and the number of subscribers is typically ranged from 8 to 20. FIG. 2 illustrates a schematic architectural diagram of a Long Term Evolution (LTE) Femto network.

The home eNB has a lower cost and more flexibility of deployment than an indoor distribution system and a pico eNB, and more functions to enhance an experience of the subscribers of a data service indoors to some extent. However, a drawback thereof lies in that the home eNB or Femto has not been optimized for the low mobility or nomadic mobility characteristic of the data service indoors, and taking the LTE Femto system as an example, the LTE Femto substantially adopts the entire LTE protocol architecture and interface design with the support of a UE handover and is complex to implement despite reductions in capacity and power of the eNB and consequently still highly expensive. Moreover, in the home eNB network, the majority of communication process flows of UEs have to be controlled and managed by the 3GPP core network, and data packets of the UEs for an access to the Internet and other external networks have to be forwarded by the 3GPP core network, thus bringing considerable signalling and data loads to the core network. This architecture also makes the home eNB network fail to be optimized in view of the characteristics of a local access of the subscribers indoors and in a hotspot area to the external networks.

In view of the issues of an access and coverage indoors and in a hotspot area, the architecture of the LTE Femto system is complex and costly, and a communication process of the UEs may bring a considerable load impact on the 3GPP core network, and the WLAN technology fails to provide the UEs with telecommunication-level QoS guaranteed services despite its simple network deployment.

SUMMARY OF THE INVENTION

Embodiments of the invention provide a method of establishing a radio bearer, an access point apparatus, a user equipment and a radio network access system so as to be adapted to the characteristics of existing indoor and hotspot data services.

An embodiment of the invention provides a method of establishing a radio bearer, including:

segmenting, by a User Equipment (UE) IP data streams of a higher-layer service into a plurality of service data streams with different Quality of Service (QoS) and determining QoS parameters corresponding to each service data stream, according to media parameter information of the higher-layer service;

sending, by the UE, a Radio Bearer Setup Request carrying information of the service data streams of the higher-layer service and the corresponding QoS parameters to a radio Access Point (AP);

establishing, by the UE, corresponding radio bearers for the service data streams according to QoS parameters available for the AP to the service data streams in a Radio Bearer Setup Response returned from the AP upon reception of the Radio Bearer Setup Response and establishing mapping relationships between the service data streams and the corresponding radio bearers; and returning, by the UE, a Radio Bearer Setup Complete Response message to the AP.

An embodiment of the invention provides a method of establishing a radio bearer, including:

receiving, by an Access Point (AP) a Radio Bearer Setup Request, sent from a User Equipment, UE, including information of a plurality of service data streams with different Quality of Service (QoS) in a higher-layer service and QoS parameters corresponding to each service data stream, determined by the UE;

determining, by the AP, QoS parameters available to the service data streams in the higher-layer service upon determining that the higher-layer service can be served according to the QoS parameters corresponding to the service data streams in the Radio Bearer Setup Request and locally preconfigured QoS strategy information;

establishing, by the AP, corresponding radio bearers respectively for the service data streams in the higher-layer service according to the determined QoS parameters;

returning, by the AP, to the UE a Radio Bearer Setup Response carrying the QoS parameters available to the service data streams in the higher-layer service and receiving a Radio Bearer Setup Complete Response message returned from the UE; and establishing, by the AP, mapping relationships between the service data streams and the radio bearers.

An embodiment of the invention provides a user equipment (UE) including an application module, a management control module and a radio communication module, wherein:

the application module is configured to provide the management control module with media parameter information of a higher-layer service;

the management control module is configured to segment IP data streams of the higher-layer service into a plurality of service data streams with different Quality of Service (QoS) and determine QoS parameters corresponding to each service data stream, according to media parameter information of the higher-layer service, and to generate a Radio Bearer Setup Request carrying information of the service data streams of the higher-layer service and the corresponding QoS parameters; to control the radio communication module according to QoS parameters available for an Access Point (AP) to the service data streams in a Radio Bearer Setup Response received by the radio communication module to establish corresponding radio bearers for the service data streams; and to establish mapping relationships between the service data streams and the corresponding radio bearers and configure the radio communication module with the mapping relationships after the radio bearers are established; and the radio communication module is configured to send the Radio Bearer Setup Request to the AP, to receive the Radio Bearer Setup Response returned from the AP, to return a Radio Bearer Setup Complete Response message to the AP after the radio bearers are established, and to map the service data streams of the higher-layer service onto the corresponding radio bearers for transmission according to the mapping relationships configured by the management control module.

An embodiment of the invention provides an access point (AP) apparatus including a radio communication module, a management control module and a data storage module, wherein:

the radio communication module is configured to receive a Radio Bearer Setup Request, sent from a User Equipment (UE) including information of a plurality of service data streams with different Quality of Service (QoS) in a higher-layer service and QoS parameters corresponding to each service data stream, determined by the UE; to receive a Radio Bearer Setup Complete Response message returned from the UE; and to map the service data streams of the higher-layer service onto corresponding radio bearers for transmission according to mapping relationships configured by the management control module;

the management control module is configured to determine QoS parameters available to the service data streams in the higher-layer service upon determining that the higher-layer service can be served according to the QoS parameters corresponding to the service data streams in the Radio Bearer Setup Request and QoS strategy information stored in the data storage module; to control the radio communication module according to the determined QoS parameters to establish the corresponding radio bearers respectively for the service data streams in the higher-layer service; to return to the UE a Radio Bearer Setup Response carrying the QoS parameters available to the service data streams in the higher-layer service through the radio communication module; and to establish the mapping relationships between the service data streams and the radio bearers when the radio communication module returns the Radio Bearer Setup Response to the UE or after the radio communication module receives the Radio Bearer Setup Complete Response message returned from the UE and configure the radio communication module with the mapping relationships; and the data storage module is configured to store the preconfigured QoS strategy information.

An embodiment of the invention provides a radio network access system including:

a User Equipment (UE) configured to segment IP data streams of a higher-layer service into a plurality of service data streams with different Quality of Service (QoS) and determine QoS parameters corresponding to each service data stream, according to media parameter information of the higher-layer service, and to send a Radio Bearer Setup Request carrying information of the service data streams of the higher-layer service and the corresponding QoS parameters to an Access Point (AP) apparatus; to establish corresponding radio bearers for the service data streams according to QoS parameters available for the AP apparatus to the service data streams in a Radio Bearer Setup Response returned from the AP apparatus upon reception of the response and to establish mapping relationships between the service data streams and the corresponding radio bearers; and to return a Radio Bearer Setup Complete Response message to the AP apparatus; and the AP apparatus configured to receive the Radio Bearer Setup Request sent from the UE, and to determine the QoS parameters available to the service data streams in the higher-layer service upon determining that the higher-layer service can be served according to the QoS parameters corresponding to the service data streams in the Radio Bearer Setup Request and locally preconfigured QoS strategy information; to establish corresponding radio bearers respectively for the service data streams in the higher-layer service according to the determined QoS parameters, to return to the UE the Radio Bearer Setup Response carrying the QoS parameters available to the service data streams in the higher-layer service and to receive the Radio Bearer Setup Complete Response message returned from the UE; and to establish mapping relationships between the service data streams and the corresponding radio bearers.

The embodiments of the invention have the following advantageous effects.

The embodiments of the invention provide a new radio access network and a new method of establishing a radio bearer, a UE and an AP apparatus, which are adapted to the new radio access network in view of the existing issue of indoor and hotspot area coverage. At the UE side, IP data streams of a service application is segmented into a plurality of service data streams with different QoS and QoS parameters of each service data stream is determined according to media parameter information, and thereafter the UE sends information of these service data streams and the corresponding QoS parameters to the AP, and the AP determines whether the service data streams can be served according to a local QoS strategy, and if so, the AP allocates and binds radio resources and establishes corresponding radio bearers for the service data stream and bind them; and the UE side also establishes a corresponding radio bearer for each service data stream and binds them, so that the AP and the UE can transmit uplink and downlink data by segmenting IP data streams of a higher-layer service into service data streams and map them respectively to corresponding radio bearers for transmission according to QoS of the different service data streams to thereby perform a perfect QoS service mechanism in the foregoing new radio access network.

Moreover, the new radio access network according to the embodiments of the invention can be implemented simply with existing LTE low layer communication technologies in view of the characteristics of existing indoor and hotspot data services to thereby provide a UE with a telecommunication-level QoS-guaranteed service, and QoS related operations will not involve participation of a core network to thereby greatly alleviate a signalling load of a core network and avoid the problems of failing to provide a UE with a QoS-guaranteed service in the existing WLAN based solution in an unlicensed frequency band and of high implementation complexity and a heavy signalling load of a core network in the existing home eNB based solution.

DETAILED DESCRIPTION OF THE EMBODIMENTS

A method of establishing a radio bearer, a user equipment, an access point apparatus and a radio access system according to embodiments of the invention will be described below in details with reference to the drawings.

The method of establishing a radio bearer, the user equipment, the access point apparatus and the radio access system according to embodiments of the invention are based upon the architecture of a Long Term Evolution Local Area Network (LTE-LAN or LTE Hi) framework according to an embodiment of the invention, and firstly the architecture of this LTE-LAN framework will be described below briefly.

Figure 3:
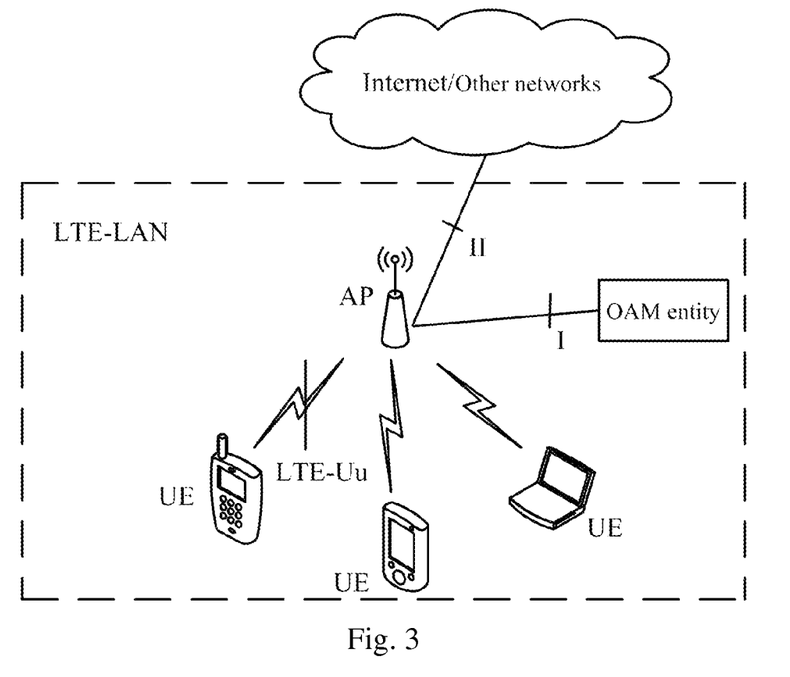
FIG. 3 is an architectural diagram of an LTE-LAN framework according to an embodiment of the invention.

In order to enable effective coverage of hotspot areas in home and enterprises environments and to provide means of communication with a large amount of data for user equipments with the characteristic of nomadic mobility, an embodiment of the invention provides an LTE-LAN system architecture implemented with low layer communication technologies of an LTE mobile communication system, and as illustrated in FIG. 3, the LTE-LAN architecture includes User Equipments (UEs), an Access Point (AP) of a radio network and an Operation Administration and Maintenance (OAM) entity, and the LTE-LAN establishes secured and QoS guaranteed radio links between the UEs and the AP with some layer 1, layer 2 and layer 3 technologies of an existing LTE mobile communication system and enables an IP access of the user equipments to an external network without involving any process of a core network of an operator by adapting the network architecture and higher-layer protocols of the existing LTE system.

Figure 4:
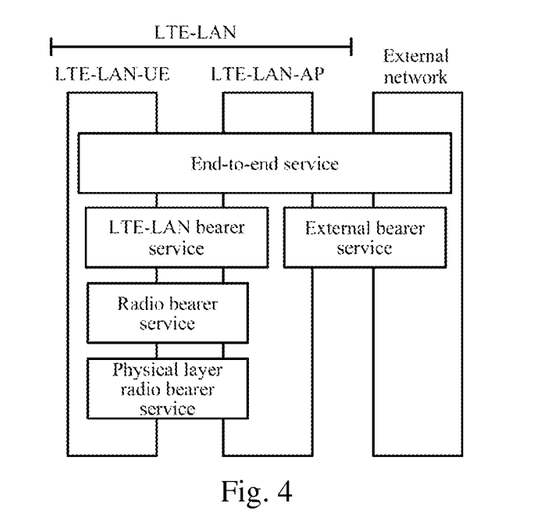
FIG. 4 is a schematic diagram of a layered QoS architectural model according to an embodiment of the invention.

For the LTE-LAN illustrated in FIG. 3, an end-to-end service is offered with the layered QoS architectural model as illustrated in FIG. 4. Particularly, the QoS of the end-to-end service is guaranteed by a bearer service inside the LTE-LAN and a bearer service between the LTE-LAN and the external network, and the bearer service of the LTE-LAN is offered by a radio bearer service between the UEs (e.g., the LTE-LAN-UE in FIG. 4) and the AP (e.g., the LTE-LAN-AP in FIG. 4), that is, by a radio bearer service via the LTE-Uu interface in FIG. 3.

Figure 5:
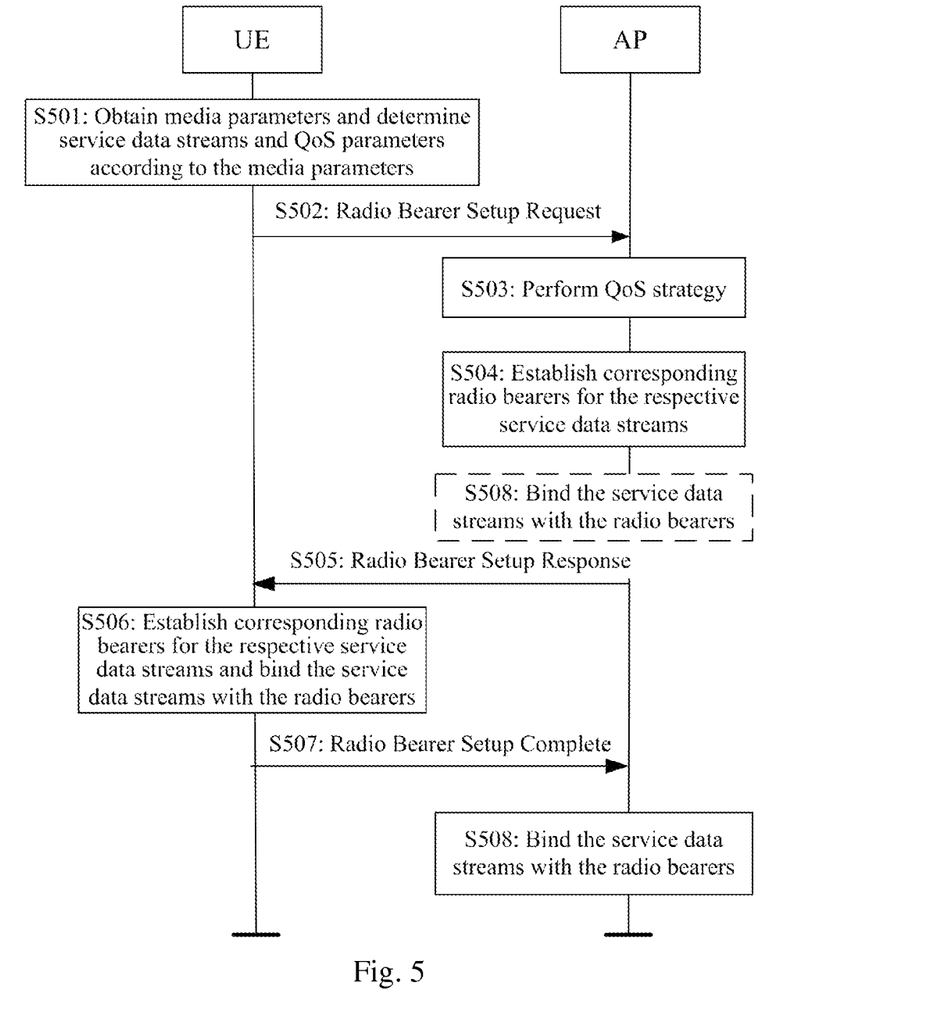
FIG. 5 is a flow chart of a method of establishing a radio bearer according to an embodiment of the invention.

For the architecture of the LTE-LAN framework described above, an embodiment of the invention provides a mechanism to offer a radio bearer service, and for details thereof, reference can be made to the following method of establishing a radio bearer as illustrated in FIG. 5, the method includes the following steps.

S501: The UE segments IP data streams of a higher-layer service into a plurality of service data streams with different Quality of Service (QoS) and determines QoS parameters corresponding to each service data stream, according to media parameter information of the higher-layer service.

When a user initiates a higher-layer service application (e.g., the user browses an Internet webpage including audio and video contents) through the UE, the UE firstly obtains media parameter information (e.g., the type, rate, IP/UDP parameters, etc.) of the higher-layer service and divides IP data streams required to browse the Internet webpage into an audio service data stream and a video service data stream and also determines QoS parameter information of these two types of service data streams according to the media parameter information of the higher-layer service application.

S502: The UE carries information of the respective service data streams of the higher-layer service and the corresponding QoS parameters in a Radio Bearer Setup Request message and sends the message to the AP.

S503: The AP determines whether the higher-layer service can be served according to the QoS parameters corresponding to the respective service data streams in the Radio Bearer Setup Request message and locally preconfigured QoS strategy information upon reception of the Radio Bearer Setup Request sent from the UE and further determines QoS parameters available to the respective service data streams in the higher-layer service when a determination result is positive.

In the step S503, the QoS strategy information determines which type of network service will be accepted in the network by the IP service stream of the UE, and the QoS strategy information may include a priority, a maximum delay in data transmission, a packet loss ratio, the type of a wideband service (a fixed wideband service or a shared wideband service), a preemption priority, a maximum rate of data transmission and other strategy information. The QoS strategy information can be set per UE in the network or per service data stream, for example, priorities, maximum delays in data transmission and other parameters corresponding to the respective service data streams can be set, or some UEs can be set to have a higher priority and a higher transmission rate while some other UEs have a lower priority and a lower transmission rate, etc., and the embodiment of the invention will not be limited to any specific form of the QoS strategy information.

A network administrator can configure a QoS strategy of a local network through an OAM entity after the LTE-LAN network is deployed in the network architecture.

S504: The AP establishes corresponding radio bearers respectively for the respective service data streams in the higher-layer service according to the determined QOS parameters.

S505: The AP returns to the UE a Radio Bearer Setup Response carrying the QoS parameters available to the respective service data streams in the higher-layer service.

In the step S503, if the AP determines that the higher-layer service can not be served by itself, then the AP returns a Radio Bearer Setup Failure Response to the UE and terminates the radio bearer establishment flow.

S506: The UE establishes corresponding radio bearers for the respective service data streams according to the QoS parameters available for the AP to the respective service data streams in Radio Bearer Setup Response returned from the AP upon reception of the Radio Bearer Setup Response and establishes mapping relationships between the respective service data streams and the corresponding radio bearers.

S507: The UE returns a Radio Bearer Setup Complete Response message to the AP.

S508: The AP establishes mapping relationships between the respective service data streams and the corresponding radio bearers.

Preferably, the foregoing step S508 can be performed when the AP returns the Radio Bearer Setup Response to the UE or can be performed upon reception of the Radio Bearer Setup Complete Response message returned from the UE.

With the foregoing flow, the radio bearers are established respectively for the respective service data streams and bound with the corresponding service data streams at the AP and UE sides, and as such the respective service data streams with the same QoS in the IP data streams of the higher-layer service can be transmitted over the corresponding radio bearers and share the same QoS service. All the service data streams transmitted over the same radio bearer have the same QoS.

Figure 6:
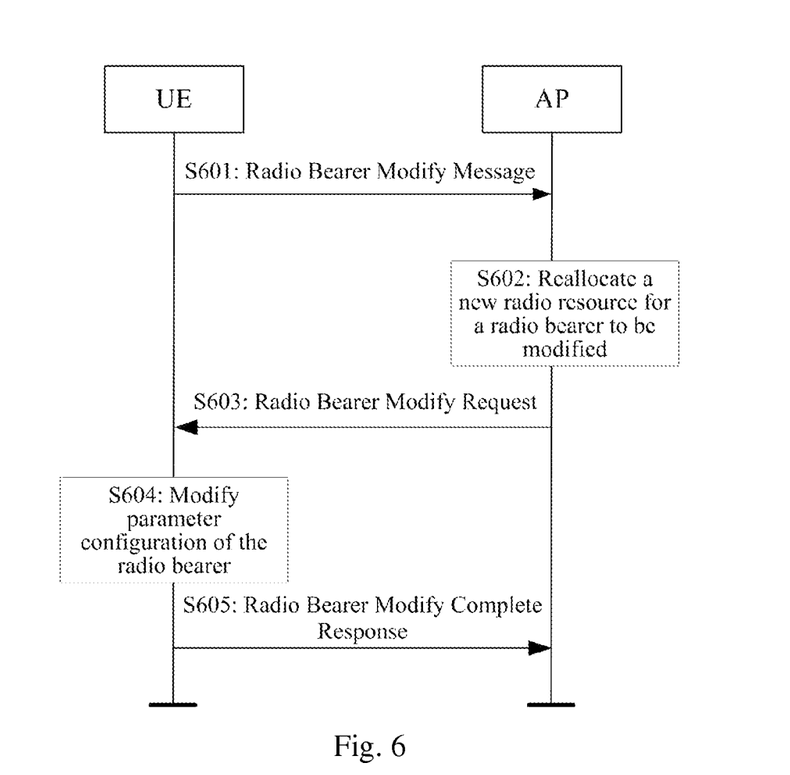
FIG. 6 is a flow chart of a process of modifying a radio bearer according to an embodiment of the invention.

Preferably, the following steps can be further included before the UE sends the Radio Bearer Setup Request to the AP:

for each service data stream, the UE determines whether there is a radio bearer capable of satisfying the QoS of the service data stream already between the UE and the AP; and if so, then the UE performs a process of modifying the radio bearer (as illustrated in FIG. 6) and establishes a mapping relationship between the service data stream and the radio bearer capable of satisfying the QoS of the service data stream after the radio bearer is modified; or if not, then the UE proceeds directly to the step of sending the corresponding Radio Bearer Setup Request to the AP to initiate a process of establishing a radio bearer.

For example, if the UE determines a QoS of an existing radio bearer in the network is the same as that of the audio service data stream, then the UE may initiate a process of modifying the radio bearer and request the AP for allocating more resources for the bearer to transmit the newly added audio service data stream.

The foregoing process of modifying the radio bearer as illustrated in FIG. 6 includes the following steps.

S601. The UE sends a Radio Bearer Modify Message to the AP to reallocate a radio resource for the radio bearer capable of satisfying the QoS of the service data stream.

S602. The AP reallocates a radio resource for the radio bearer to be modified upon reception of the Radio Bearer Modify Message.

S603. The AP carries its own QoS parameters available to the service data stream corresponding to the modified radio bearer in a Radio Bearer Modify Request and returns the request to the UE and establishes a mapping relationship between the service data stream and the modified radio bearer.

Taking the audio service data stream again as an example, then the newly added audio service data stream is bound with the modified radio bearer in the step S603.

S604. The UE modifies parameter configuration of the radio bearer locally according to the QoS parameters available for the AP to the service data stream in the Radio Bearer Modify Request returned from the AP upon reception of the response and establishes a mapping relationship between the service data stream and the modified radio bearer.

The UE can also bind the newly added service data stream with the modified radio bearer.

S605. The UE returns a Radio Bearer Modify Complete Response to the AP.

The foregoing process of modifying the radio bearer can alternatively be initiated by the AP as instructed by the UE or initiated directly by the AP in the case that there is a change in media parameter of the higher-layer service or the network administrator changes the QoS strategy in the AP through the OAM entity. The foregoing step S601 will be skipped if it is initiated directly by the AP.

Figure 7:
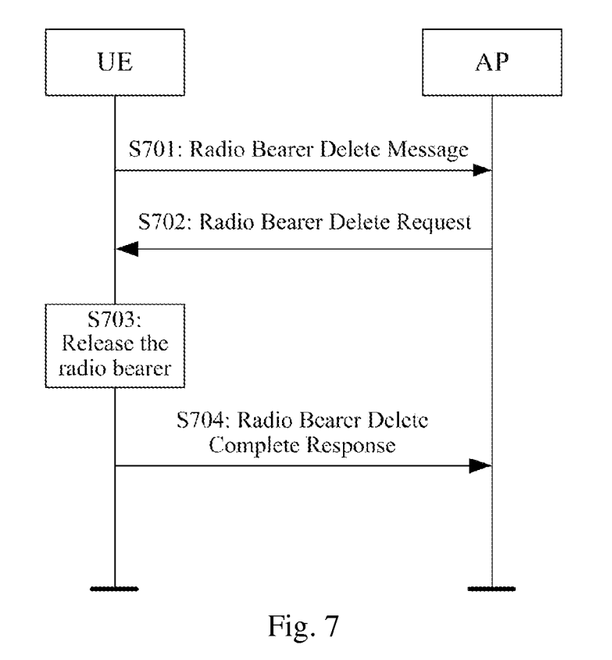
FIG. 7 is a flow chart of a process of deleting a radio bearer according to an embodiment of the invention.

Furthermore, if an established radio bearer between the AP and the UE has to be deleted as needed in practice, for example, due to termination of the higher-layer application, insufficient radio resources, a change in local QoS strategy, etc., then a process of deleting the radio bearer as illustrated in FIG. 7 is performed, which includes the following steps.

S701: The UE sends a Radio Bearer Delete Message to the AP.

S702: The AP releases a radio resource of the radio bearer to be deleted and sends a Radio Bearer Delete Request to the UE.

S703: The UE releases the radio resource of the radio bearer to be deleted upon reception of the Radio Bearer Delete Request returned from the AP.

S704: The UE returns a Radio Bearer Delete Complete Response to the AP.

The foregoing process of deleting the radio bearer can be initiated by the AP as requested by the UE or initiated directly by the AP, and the foregoing step S701 can be skipped if it is initiated directly by the AP.

Based upon the same inventive idea, embodiments of the invention further provide a User Equipment (UE), an Access Point (AP) apparatus and a radio access system, and since the user equipment, the access point apparatus and the radio access system address the problem under a principle similar to the foregoing method of establishing a radio bearer, reference can be made to the implementation of the method for implementations of these devices, and a repeated description thereof will be omitted here.

Figure 8:
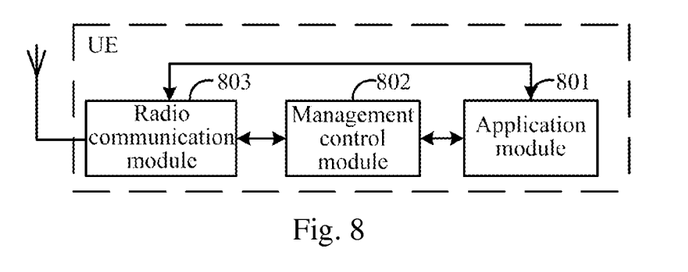
FIG. 8 is a schematic structural diagram of a user equipment according to an embodiment of the invention.

A user equipment according to an embodiment of the invention as illustrated in FIG. 8 includes an application module 801, a management control module 802 and a radio communication module 803.

The application module 801 is configured to provide the management control module 802 with media parameter information (e.g., the type, rate, IP/UDP parameters, etc.) of a higher-layer service.

The management control module 802 is configured to segment IP data streams of the higher-layer service into a plurality of service data streams with different Quality of Service (QoS) and determine QoS parameters corresponding to each service data stream according to the media parameter information of the higher-layer service, and to generate a Radio Bearer Setup Request carrying information of the service data streams of the higher-layer service and the corresponding QoS parameters; to control the radio communication module 803 according to QoS parameters available for an AP to the respective service data streams in a Radio Bearer Setup Response received by the radio communication module 803 to establish corresponding radio bearers for the respective service data streams; and to establish mapping relationships between the respective service data streams and the corresponding radio bearers and configure the radio communication module 803 with the mapping relationships after the radio bearers are established.

The radio communication module 803 is configured to send the Radio Bearer Setup Request generated by the management control module 802 to the AP, to receive the Radio Bearer Setup Response returned from the AP, to establish the corresponding radio bearers for the respective service data streams under the control of the management control module 802, and to map the respective service data streams of the higher-layer service onto the corresponding radio bearers for transmission according to the mapping relationships configured by the management control module 802.

Furthermore, the management control module 802 is further configured to determine for each service data stream whether there is a radio bearer capable of satisfying the QoS of the service data stream between the UE and the AP; and if so, to send a Radio Bearer Modify Message to the AP through the radio communication module to instruct to reallocate a radio resource for the radio bearer capable of satisfying the QoS of the service data stream; to receive a Radio Bearer Modify Request returned from the AP in response to the Radio Bearer Modify Message; to modify parameter configuration of the radio bearer locally according to QoS parameters available for the AP to the service data stream in the Radio Bearer Modify Request upon reception of the response returned from the AP, and to return a Radio Bearer Modify Complete Response to the AP through the radio communication module; and to establish a mapping relationship between the service data stream and the radio bearer capable of satisfying the QoS of the service data stream.

Furthermore, if a process of deleting a radio bearer is involved, then when a radio bearer between the UE and the AP needs to be deleted, the management control module 802 is further configured to send a Radio Bearer Delete Message to the AP through the radio communication module 803; and to release a radio resource of the radio bearer to be deleted and return a Radio Bearer Delete Complete Response to the AP through the radio communication module 803 after the radio communication module 803 receives a Radio Bearer Delete Request returned from the AP.

Preferably, the management control module 802 according to the embodiment of the invention can be arranged with a QoS management configuration sub-module, dedicated to QoS management, configured to perform the various functions of the management control module 802.

Figure 9:
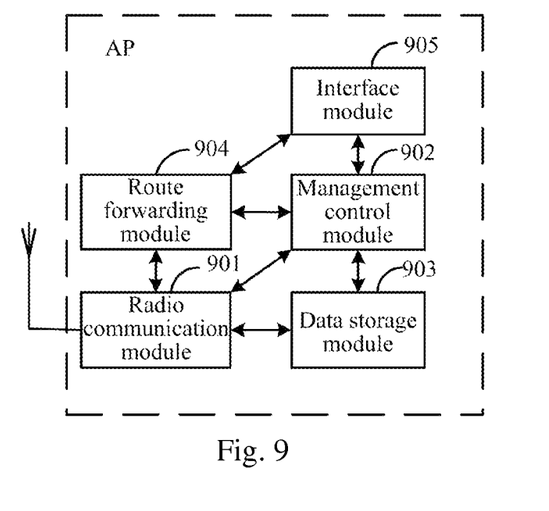
FIG. 9 is a schematic structural diagram of an access point apparatus according to an embodiment of the invention.

An Access Point apparatus according to an embodiment of the invention as illustrated in FIG. 9 includes a radio communication module 901, a management control module 902 and a data storage module 903.

The radio communication module 901 is configured to receive a Radio Bearer Setup Request, sent from a UE, including information of a plurality of service data streams with different Quality of Service (QoS) in a higher-layer service and corresponding QoS parameters, determined by the UE; to receive a Radio Bearer Setup Complete Response message returned from the UE; and to map the respective service data streams of the higher-layer service onto corresponding radio bearers for transmission according to mapping relationships configured by the management control module 902.

The management control module 902 is configured to determine whether the higher-layer service can be served according to the QoS parameters corresponding to the respective service data streams in the Radio Bearer Setup Request and QoS strategy information stored in the data storage module, and to determine QoS parameters available to the respective service data streams in the higher-layer service when a determination result is positive; to control the radio communication module 901 according to the determined QoS parameters to establish the corresponding radio bearers respectively for the respective service data streams in the higher-layer service; to return to the UE a Radio Bearer Setup Response carrying the QoS parameters available to the respective service data streams in the higher-layer service through the radio communication module 901; and to establish the mapping relationships between the respective service data streams and the corresponding radio bearers and configure the radio communication module 901 with the mapping relationships when the radio communication module 901 returns the Radio Bearer Setup Response to the UE or after the radio communication module 901 receives the Radio Bearer Setup Complete Response message returned from the UE.

The data storage module 903 is configured to store the preconfigured QoS strategy information.

Furthermore, if a process of modifying a radio bearer is involved, then when the radio communication module receives a Radio Bearer Modify Message initiated by the UE or parameter configuration of a radio bearer needs to be modified locally, the management control module 902 is further configured to control the radio communication module 901 to reallocate a radio resource for the radio bearer to be modified, to return a Radio Bearer Modify Request carrying QoS parameters available for the AP to a service data stream corresponding to the modified radio bearer to the UE through the radio communication module 901.

Correspondingly, the radio communication module 901 is further configured to reallocate a radio resource for the radio bearer to be modified under the control of the management control module 902 and send the Radio Bearer Modify Request to the UE; to receive a Radio Bearer Modify Complete Response returned from the UE in response to the Radio Bearer Modify Request; and to establish a mapping relationship between the service data stream and the modified radio bearer.

Furthermore, if a process of deleting a radio bearer is involved, then when the radio communication module 901 receives a Radio Bearer Delete Message sent from the UE or a radio bearer needs to be deleted locally, the management control module 902 is further configured to control the radio communication module 901 to release a radio resource of the radio bearer to be deleted and to send a Radio Bearer Delete Request to the UE through the radio communication module 901.

The radio communication module 901 is further configured to receive a Radio Bearer Delete Complete Response returned from the UE in response to the Radio Bearer Delete Request.

The foregoing AP apparatus according to the embodiment of the invention as illustrated in FIG. 9 can further include a route forwarding module 904 and an interface module 905.

The management control module 902 controls a packet forwarding mechanism of the route forwarding module 904 based upon a QoS of the UE and maps a radio bearer to an external bearer service to thereby guarantee a QoS of a data packet transmitted via another interface than an LTE-Uu interface. For example, in the case that there is a DiffServ domain-enabled interface II between an external network and an LTE-LAN network, the management control module 902 can distinguish forwarding priorities of different packets with the use of the DiffServ technology at the IP layer through the route forwarding module to thereby preferentially guarantee transmission of a packet with a high priority so that an external bearer can provide the UE with a QoS guaranteed service.

The interface module 905 is generally responsible for management and maintenance functions of the interface II between the AP in the LTE-LAN and the external network, and in the case that the AP is arranged separate from an OAM entity in the LTE-LAN, it is further responsible for managing and maintaining an interface I. A particular implementation thereof will not be detailed here.

Preferably, the management control module 902 according to the embodiment of the invention can be arranged with a QoS management configuration sub-module, dedicated to QoS management, configured to perform the various functions of the management control module 902.

A radio access system according to an embodiment of the invention as illustrated in FIG. 3 includes:

a User Equipment (UE) configured to segment IP data streams of a higher-layer service into a plurality of service data streams with different Quality of Service (QoS) and determine QoS parameters corresponding to each service data stream according to media parameter information of the higher-layer service, and to send a Radio Bearer Setup Request carrying information of the respective service data streams of the higher-layer service and the corresponding QoS parameters to an Access Point (AP) apparatus; to establish corresponding radio bearers for the respective service data streams according to QoS parameters available for the AP apparatus to the respective service data streams in a Radio Bearer Setup Response returned from the AP apparatus upon reception of the response and to establish mapping relationships between the respective service data streams and the corresponding radio bearers; and to return a Radio Bearer Setup Complete Response message to the AP apparatus; and the AP apparatus configured to receive the Radio Bearer Setup Request sent from the UE, and to determine whether the higher-layer service can be served according to the QoS parameters corresponding to the respective service data streams in the Radio Bearer Setup Request and locally preconfigured QoS strategy information and further determine the QoS parameters available to the respective service data streams in the higher-layer service when a determination result is positive; to establish corresponding radio bearers respectively for the respective service data streams in the higher-layer service according to the determined QoS parameters, to return to the UE the Radio Bearer Setup Response carrying the QoS parameters available to the respective service data streams in the higher-layer service and to receive the Radio Bearer Setup Complete Response message returned from the UE; and to establish mapping relationships between the respective service data streams and the corresponding radio bearers.

Furthermore, the radio access system according to the embodiment of the invention further includes an Operation Administration and Maintenance (OAM) entity, connected with the AP apparatus, configured to provide a network administrator with an interface via which the QoS strategy information is configured.

In the radio access system according to the embodiment of the invention, the OAM entity can be arranged in the same physical apparatus together with the AP or can be arranged separate from the AP as two different physical apparatuses, and the embodiment of the invention will not be limited in this regard.

The embodiments of the invention provide a new radio access network and a new method of establishing a radio bearer, a UE and an AP apparatus, which are adapted to the new radio access network in view of the existing issue of indoor and hotspot area coverage. At the UE side, IP data streams of a service application is segmented into a plurality of service data streams with different QoS and QoS parameters of each service data stream is determined according to media parameter information, and thereafter the UE sends information of these service data streams and the corresponding QoS parameters to the AP, and the AP determines whether the service data streams can be served according to a local QoS strategy, and if so, the AP allocates radio resources and establishes corresponding radio bearers for the service data streams and binds them; and the UE side also establishes a corresponding radio bearer for each service data stream and binds them, so that the AP and the UE can transmit uplink and downlink data by segmenting IP data streams of a higher-layer service into service data streams and map them respectively to corresponding radio bearers for transmission according to QoS of the different service data streams to thereby perform a perfect QoS service mechanism in the foregoing new radio access network.

Moreover, the new radio access network according to the embodiments of the invention can be implemented simply with existing LTE low layer communication technologies in view of the characteristics of existing indoor and hotspot data services to thereby provide a UE with a telecommunication-level QoS-guaranteed service, and QoS related operations will not involve participation of a core network node to thereby greatly alleviate a signalling load of a core network and avoid the problems of failing to provide a UE with a QoS-guaranteed service in the existing wireless local area network based solution in an unlicensed frequency band and of high implementation complexity and a heavy signalling load of a core network in the existing home eNB based solution.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method of establishing a radio bearer, comprising:
segmenting, by a User Equipment, UE, IP data streams of a higher-layer service into a plurality of service data streams with different Quality of Service, QoS, and determining QoS parameters corresponding to each service data stream, according to media parameter information of the higher-layer service;
sending, by the UE, a Radio Bearer Setup Request carrying information of the service data streams of the higher-layer service and the corresponding QoS parameters to a radio Access Point, AP;
establishing, by the UE, corresponding radio bearers for the service data streams according to QoS parameters, determined by the AP, without any input from a core network device, available to the service data streams in a Radio Bearer Setup Response returned from the AP upon reception of the Radio Bearer Setup Response, and establishing mapping relationships between the service data streams and the corresponding radio bearers; and
returning, by the UE, a Radio Bearer Setup Complete Response message to the AP;
wherein before the UE sends the Radio Bearer Setup Request to the AP, the method further comprises:
for each service data stream, determining, by the UE, whether there is a radio bearer capable of satisfying the QoS of the service data stream between the UE and the AP;
if so, then sending a Radio Bearer Modify Message to the AP to instruct the AP to reallocate a radio resource for the radio bearer capable of satisfying the QoS of the service data stream;
if not, then determining information of the service data stream and the corresponding QoS parameters need to be carried in the Radio Bearer Setup Request.

2. The method according to claim 1, wherein
after sending, by the UE, a Radio Bearer Modify Message to the AP to instruct to reallocate a radio resource for the radio bearer capable of satisfying the QoS of the service data stream, the method further comprises:
modifying, by the UE, parameter configuration of the radio bearer locally according to QoS parameters, in a Radio Bearer Modify Request returned from the AP, available for the AP to the service data stream upon reception of the request, and returning a Radio Bearer Modify Complete Response to the AP; and establishing a mapping relationship between the service data stream and the radio bearer capable of satisfying the QoS of the service data stream.

3. The method according to claim 2, wherein when the UE needs to delete a radio bearer between the UE and the AP, the method further comprises:
sending, by the UE, a Radio Bearer Delete Message to the AP;
releasing, by the UE, a radio resource of the radio bearer to be deleted upon reception of a Radio Bearer Delete Request returned from the AP; and
returning, by the UE, a Radio Bearer Delete Complete Response to the AP.

4. A method of establishing a radio bearer, comprising:
receiving, by an Access Point, AP, a Radio Bearer Setup Request, sent from a User Equipment, UE, comprising information of a plurality of service data streams with different Quality of Service, QoS, in a higher-layer service and QoS parameters corresponding to each service data stream, determined by the UE;
determining, by the AP, without any input from a core network device, QoS parameters available to the service data streams in the higher-layer service upon determining that the higher-layer service can be served according to the QoS parameters corresponding to the service data streams in the Radio Bearer Setup Request and locally preconfigured QoS strategy information;
establishing, by the AP, corresponding radio bearers respectively for the service data streams in the higher-layer service according to the determined QoS parameters;
returning, by the AP, to the UE a Radio Bearer Setup Response carrying the QoS parameters available to the service data streams in the higher-layer service and receiving a Radio Bearer Setup Complete Response message returned from the UE; and establishing, by the AP, mapping relationships between the service data streams and the radio bearers;
wherein the method further comprises:
for each service data stream, when it is determined by the UE that there is a radio bearer capable of satisfying the QoS of the service data stream between the UE and the AP, receiving, by the AP, a Radio Bearer Modify Message to instruct the AP to reallocate a radio resource for the radio bearer capable of satisfying the QoS of the service data stream sent by the UE.

5. The method according to claim 4, wherein when the AP receives a Radio Bearer Modify Message initiated from the UE or needs to modify parameter configuration of a radio bearer locally, the method further comprises:
reallocating, by the AP, a radio resource for the radio bearer to be modified;
returning, by the AP, a Radio Bearer Modify Request carrying QoS parameters available for the AP to a service data stream corresponding to the modified radio bearer to the UE; and
receiving, by the AP, a Radio Bearer Modify Complete Response returned from the UE and establishing a mapping relationship between the service data stream and the modified radio bearer.

6. The method according to claim 4, wherein when the AP receives a Radio Bearer Delete Message sent from the UE or needs to delete a radio bearer locally, the method further comprises:
releasing, by the AP, a radio resource of the radio bearer to be deleted and sending a Radio Bearer Delete Request to the UE; and
receiving, by the AP, a Radio Bearer Delete Complete Response returned from the UE.

7. The method according to claim 4, wherein the QoS strategy information comprises a priority, a maximum delay in data transmission, a packet loss ratio, a type of wideband service, a preemption priority, or a maximum rate of data transmission provided for a service data stream or a UE.

8. The method according to claim 5, wherein the QoS strategy information comprises a priority, a maximum delay in data transmission, a packet loss ratio, a type of wideband service, a preemption priority, or a maximum rate of data transmission provided for a service data stream or a UE.

9. The method according to claim 6, wherein the QoS strategy information comprises a priority, a maximum delay in data transmission, a packet loss ratio, a type of wideband service, a preemption priority, or a maximum rate of data transmission provided for a service data stream or a UE.

10. A User Equipment, UE, comprising an application module, a management control module and a radio communication module, wherein:
the application module is configured to provide the management control module with media parameter information of a higher-layer service;
the management control module is configured to segment IP data streams of the higher-layer service into a plurality of service data streams with different Quality of Service, QoS, and determine QoS parameters corresponding to each service data stream, according to media parameter information of the higher-layer service, and to generate a Radio Bearer Setup Request carrying information of the service data streams of the higher-layer service and the corresponding QoS parameters; to control the radio communication module according to QoS parameters, determined by an Access Point, AP, without any input from a core network device, available to the service data streams in a Radio Bearer Setup Response received by the radio communication module to establish corresponding radio bearers for the service data streams; and to establish mapping relationships between the service data streams and the corresponding radio bearers and configure the radio communication module with the mapping relationships after the radio bearers are established; and
the radio communication module is configured to send the Radio Bearer Setup Request to the AP, to receive the Radio Bearer Setup Response returned from the AP, to return a Radio Bearer Setup Complete Response message to the AP after the radio bearers are established, and to map the service data streams of the higher-layer service onto the corresponding radio bearers for transmission according to the mapping relationships configured by the management control module;
wherein the management control module is further configured to determine for each service data stream whether there is a radio bearer capable of satisfying the QoS of the service data stream between the UE and the AP; and if so, to send a Radio Bearer Modify Message to the AP through the radio communication module to instruct the AP to reallocate a radio resource for the radio bearer capable of satisfying the QoS of the service data stream.

11. The user equipment according to claim 10, wherein after the management control module sends a Radio Bearer Modify Message to the AP through the radio communication module to instruct to reallocate a radio resource for the radio bearer capable of satisfying the QoS of the service data stream, the management control module is further configured to receive a Radio Bearer Modify Request returned from the AP in response to the Radio Bearer Modify Message; to modify parameter configuration of the radio bearer locally according to QoS parameters, available for the AP to the service data stream, in the Radio Bearer Modify Request upon reception of the request returned from the AP, and to return a Radio Bearer Modify Complete Response to the AP through the radio communication module; and to establish a mapping relationship between the service data stream and the radio bearer capable of satisfying the QoS of the service data stream.

12. The user equipment according to claim 10, wherein when a radio bearer between the UE and the AP needs to be deleted, the management control module is further configured to send a Radio Bearer Delete Message to the AP through the radio communication module; and to release a radio resource of the radio bearer to be deleted after the radio communication module receives a Radio Bearer Delete Request returned from the AP and return a Radio Bearer Delete Complete Response to the AP through the radio communication module.

13. An Access Point, AP, apparatus, comprising a radio communication module, a management control module and a data storage module, wherein:
the radio communication module is configured to receive a Radio Bearer Setup Request, sent from a User Equipment, UE, comprising information of a plurality of service data streams with different Quality of Service, QoS, in a higher-layer service and QoS parameters corresponding to each service data stream, determined by the UE; to receive a Radio Bearer Setup Complete Response message returned from the UE; and to map the service data streams of the higher-layer service onto corresponding radio bearers for transmission according to mapping relationships configured by the management control module;

the management control module is configured to determine QoS parameters, without any input from a core network device, available to the service data streams in the higher-layer service upon determining that the higher-layer service can be served according to the QoS parameters corresponding to the service data streams in the Radio Bearer Setup Request and QoS strategy information stored in the data storage module; to control the radio communication module according to the determined QoS parameters to establish the corresponding radio bearers respectively for the service data streams in the higher-layer service; to return to the UE a Radio Bearer Setup Response carrying the QoS parameters available to the service data streams in the higher-layer service through the radio communication module; and to establish the mapping relationships between the service data streams and the radio bearers when the radio communication module returns the Radio Bearer Setup Response to the UE or after the radio communication module receives the Radio Bearer Setup Complete Response message returned from the UE and configure the radio communication module with the mapping relationships; and the data storage module is configured to store the preconfigured QoS strategy information;

wherein for each service data stream, when it is determined by the UE that there is a radio bearer capable of satisfying the QoS of the service data stream between the UE and the AP, the radio communication module is further configured to receive a Radio Bearer Modify Message to instruct the AP to reallocate a radio resource for the radio bearer capable of satisfying the QoS of the service data stream sent by the UE.

14. The access point apparatus according to claim 13, wherein when the radio communication module receives a Radio Bearer Modify Message initiated by the UE or parameter configuration of a radio bearer needs to be modified locally, the management control module is further configured to control the radio communication module to reallocate a radio resource for the radio bearer to be modified, to return a Radio Bearer Modify Request carrying QoS parameters available for the AP to a service data stream corresponding to the modified radio bearer to the UE through the radio communication module; and the radio communication module is further configured to receive a Radio Bearer Modify Complete Response returned from the UE in response to the Radio Bearer Modify Request, and to establish a mapping relationship between the service data stream and the modified radio bearer.

15. The access point apparatus according to claim 14, wherein when the radio communication module receives a Radio Bearer Delete Message sent from the UE or a radio bearer needs to be deleted locally, the management control module is further configured to control the radio communication module to release a radio resource of the radio bearer to be deleted and to send a Radio Bearer Delete Request to the UE through the radio communication module; and the radio communication module is further configured to receive a Radio Bearer Delete Complete Response returned from the UE in response to the Radio Bearer Delete Request.

* * * * *